(12) United States Patent
Ahern et al.

(10) Patent No.: US 10,065,843 B2
(45) Date of Patent: Sep. 4, 2018

(54) METHOD AND SYSTEM FOR A LIFT DEVICE CONTROL SYSTEM

(71) Applicant: Xtreme Manufacturing, LLC, Las Vegas, NV (US)

(72) Inventors: Don Francis Ahern, Las Vegas, NY (US); Ronald Lee Fifield, Las Vegas, NV (US)

(73) Assignee: Xtreme Manufacturing, LLC, Las Vegas, NV (US)

( * ) Notice: Subject to any disclaimer, the term of this patent is extended or adjusted under 35 U.S.C. 154(b) by 80 days.

(21) Appl. No.: 15/123,585

(22) PCT Filed: Mar. 3, 2015

(86) PCT No.: PCT/US2015/018466
§ 371 (c)(1),
(2) Date: Sep. 2, 2016

(87) PCT Pub. No.: WO2015/134482
PCT Pub. Date: Sep. 11, 2015

(65) Prior Publication Data
US 2017/0081162 A1 Mar. 23, 2017

Related U.S. Application Data

(60) Provisional application No. 61/947,313, filed on Mar. 3, 2014.

(51) Int. Cl.
*B66F 11/04* (2006.01)
*B62D 5/04* (2006.01)
(Continued)

(52) U.S. Cl.
CPC .......... *B66F 11/042* (2013.01); *B62D 5/046* (2013.01); *B62D 6/002* (2013.01); *B62D 7/142* (2013.01);
(Continued)

(58) Field of Classification Search
CPC .... B66F 11/042; B66F 17/006; B62D 7/1509; B62D 7/142; B62D 6/002; B62D 5/046
See application file for complete search history.

(56) References Cited

U.S. PATENT DOCUMENTS

| 4,598,797 A | 7/1986 | Schultz |
| 5,103,925 A * | 4/1992 | Imaseki ............... B60T 8/1755 180/415 |

(Continued)

FOREIGN PATENT DOCUMENTS

| EP | 0786432 A2 | 7/1997 |
| EP | 0884202 B1 | 7/2002 |

(Continued)

OTHER PUBLICATIONS

Extended European Search Report, dated Sep. 29, 2017, for copending EP patent application No. EP15759334.4 (7 pgs.).

(Continued)

*Primary Examiner* — Mussa A Shaawat
*Assistant Examiner* — Michael V Kerrigan
(74) *Attorney, Agent, or Firm* — Armstrong Teasdale LLP

(57) ABSTRACT

A system and method of controlling a scissors lift vehicle are provided. The system includes a main computer including one or more processors and one or more memory devices communicatively coupled to the one or more processors, a steer controller configured to receive commands from the main computer to control a plurality of independently steerable wheel assemblies, each wheel assembly including a steer angle sensor, a steer angle actuator, and a drive motor, and a scissors lift controller configured to control a hydraulic piston assembly including a hydraulic fluid reservoir internal to a piston rod assembly. The system also includes a tilt sensor configured to determine an angle of incline the scissors lift vehicle, a variable-speed steer actuator configured to rotate a wheel assembly about the steer axis of (Continued)

rotation at a selectable rate, and a wheel including a respective drive axis of rotation.

20 Claims, 7 Drawing Sheets

(51) Int. Cl.
*B62D 6/00* (2006.01)
*B62D 7/14* (2006.01)
*B62D 7/15* (2006.01)
*B66F 17/00* (2006.01)

(52) U.S. Cl.
CPC .......... *B62D 7/1509* (2013.01); *B66F 17/006* (2013.01)

(56) References Cited

U.S. PATENT DOCUMENTS

| | | | |
|---|---|---|---|
| 6,371,243 B1 | 4/2002 | Donaldson et al. | |
| 8,332,089 B2 * | 12/2012 | Nakazawa | B66F 9/20 701/22 |
| 9,434,412 B2 * | 9/2016 | Clark | B62D 7/1509 |
| 2006/0174614 A1 * | 8/2006 | Dong | F04B 1/324 60/444 |
| 2008/0097666 A1 | 4/2008 | Oba et al. | |
| 2012/0043159 A1 | 2/2012 | Clark et al. | |

FOREIGN PATENT DOCUMENTS

| | | |
|---|---|---|
| JP | H04217597 A | 8/1992 |
| WO | 9954190 A1 | 10/1999 |
| WO | 2013059243 A1 | 4/2013 |

OTHER PUBLICATIONS

International Search Report and Written Opinion, dated Jun. 1, 2015, for International application No. PCT/US2015/018466.

* cited by examiner

METHOD AND SYSTEM FOR A LIFT DEVICE CONTROL SYSTEM

CROSS REFERENCE TO RELATED APPLICATIONS

This application is a 35 U.S.C. § 371 national stage application of PCT International Application No. PCT/US2015/018466, filed on Mar. 3, 2015, which claims priority to and the benefit of the filing date of U.S. Provisional Application No. 61/947,313 filed on Mar. 3, 2014, both of which are hereby incorporated by reference in their entirety.

BACKGROUND

This description relates to lift devices, and, more particularly, to mobile elevating work platform systems and methods of controlling the operation of mobile elevating work platforms.

Various types of mobile elevating work platforms have a lift mechanism that can be moved in a vertical direction to bring a worker close to otherwise inaccessible locations. The lift mechanism is often mounted to a self-propelled carriage or chassis having wheels for moving the platform between work areas. In one type of mobile elevating work platforms, the lift mechanism to achieve the vertical lift is often referred to as a "scissor lift," in which a plurality of linked, folding supports oriented in a crisscross or "X" pattern in a "scissors stack." The upward motion is achieved by the application of a force to a set of parallel linkages, elongating the crossing pattern, and propelling the work platform vertically. With the scissors stack mounted on the carriage above the wheels, the wheels, steering configuration, and propulsion configuration are typically a standard arrangement of axles, wheels, linkage arms, and motors or drives. Such convention steering limits the motion of the mobile work platform. For example, a turn radius is limited and the ability to crab the platform in a direction without turning it is virtually non-existent.

Scissors lift devices are most useful if they are self-propelled. Current scissor lift designs have many of the propelling features mounted under the scissors lift assembly. A hydraulic system, electrical system including batteries, and a control system are also typically mounted on the carriage below the scissors lift assembly. Additionally, axles, steering and transmission components are also mounted on the carriage under the scissors lift assembly. Many systems of the scissors lift device are controlled manually or by interlocks that prevent operation of a feature when a condition is met.

BRIEF DESCRIPTION

In one aspect, a vehicle control system includes a main computer including one or more processors and one or more memory devices communicatively coupled to the one or more processors, a steer controller configured to receive commands from the main computer to control a plurality of independently steerable wheel assemblies, each wheel assembly including a steer angle sensor, a steer angle actuator, and a drive motor, and a scissors lift controller configured to control a hydraulic piston assembly including a hydraulic fluid reservoir internal to a piston rod assembly. The system also includes a tilt sensor configured to determine an angle of incline the scissors lift vehicle, a variable-speed steer actuator configured to rotate a wheel assembly about the steer axis of rotation at a selectable rate, and a wheel including a respective drive axis of rotation.

In another aspect, a method of controlling a scissors lift vehicle that includes a plurality of independently steerable wheel assemblies is provided. The method includes receiving a steer command from a user input device, determining a first steering speed command for a first wheel assembly based on the steer command, the first wheel assembly independent of all other wheel assemblies, and determining a target steering angle for a second wheel assembly, the target steering angle based on a current steering angle of the first wheel assembly.

In still another aspect, a scissors lift vehicle includes a main computer including one or more processors and one or more memory devices communicatively coupled to the one or more processors, a steer controller configured to receive commands from the main computer to control a plurality of independently steerable wheel assemblies, each wheel assembly including a steer angle sensor, a steer angle actuator, and a drive motor, and a scissors lift controller configured to control a hydraulic piston assembly including a hydraulic fluid reservoir internal to a piston rod assembly. The system also includes a tilt sensor configured to determine an angle of incline the scissors lift vehicle, a variable-speed steer actuator configured to rotate a wheel assembly about the steer axis of rotation at a selectable rate, and a wheel including a respective drive axis of rotation.

BRIEF DESCRIPTION OF THE DRAWINGS

FIGS. 1-6 show example embodiments of the method and apparatus described herein.

FIG. 1 is a side elevation view of a scissors lift vehicle in accordance with an example embodiment of the present disclosure.

FIG. 2 is a data flow diagram of a control system that may be used with scissors lift vehicle shown in FIG. 1.

FIG. 3 is a cut-away cross-sectional view of a fluid cylinder assembly in accordance with an example embodiment of the present disclosure.

FIG. 4 is a schematic diagram of a fluid flow circuit within fluid cylinder assembly shown in FIG. 3.

FIG. 5 is a flow diagram of a method of controlling the scissors lift vehicle shown in FIG. 1 that includes a plurality of wheel assemblies.

Figure 1:
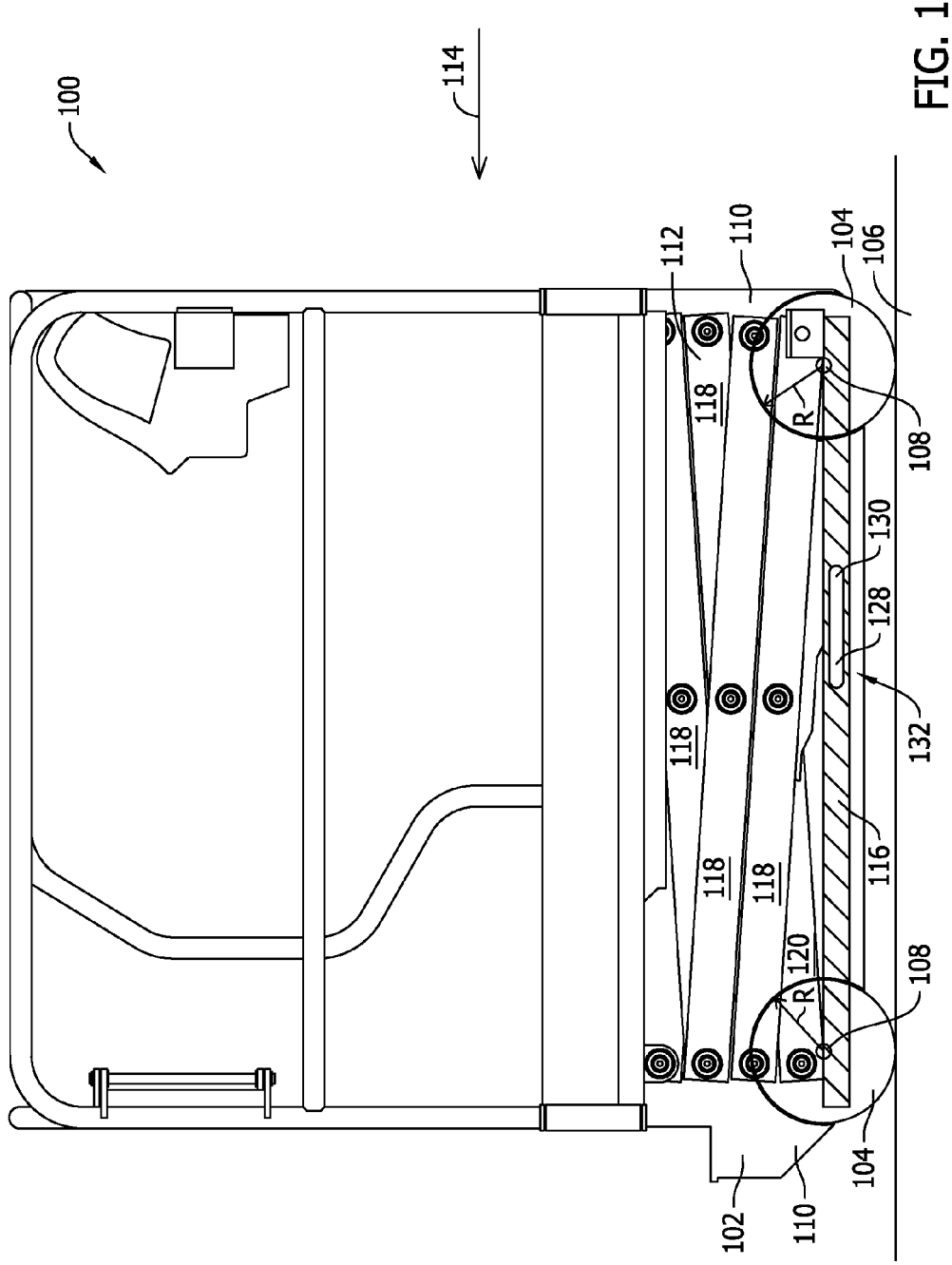

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to embodiments of a scissors lift vehicle and a method of operating a scissors lift vehicle.

In the example embodiment, the scissors lift vehicle includes a carriage comprising a plurality of independently steerable wheels configured to engage a travel surface. The travel surface could be any sufficiently smooth surface, which permits the scissors lift vehicle to operate thereon, for example, but not limited to an asphalt surface. Travel surface may be, for example, concrete, wood, carpet, tile, or other surface in an indoor application of the scissors lift vehicle. The wheels are configured to rotate about an axle having a drive axis of rotation, the wheel powered by a respective drive unit, such as, but not limited to an electric drive motor coupled directly to the wheel or to the wheel through a gear or transmission assembly. Typically, one wheel is positioned at or near each corner of the rectangularly-shaped carriage. The wheels are spaced as far as possible to improve the stability of the scissors lift vehicle, especially when the scissors stack assembly is extended. In various embodiments, more than four wheels, one at each corner may be used. Additionally, carriage may not be regularly-shaped, but may have other shapes, where additional wheels could be used. The wheels may be spaced apart in a fore/aft direction and in a right/left or athwartships direction. At least some of the wheel assemblies are configured to steer a respective wheel independently with respect to wheels associated with a remainder of the plurality of wheel assemblies. Some wheels may be steerable by their respective wheel assemblies, some wheels may be fixed with respect to the carriage, and some wheels may simply follow the carriage.

In various embodiments, the wheel assembly includes a linear steer guide assembly. The linear guide assembly includes a linear drive device configured to translate a follower along a linear path. The linear drive device may be embodied in, for example, a ball screw assembly or lead screw assembly coupled to a steer motor, a hydraulic or pneumatic piston assembly, or other linear driver. The linear guide assembly also includes a steering bracket coupled to a wheel bracket. The wheel bracket is configured to support the wheel associated with the respective wheel assembly. The steering bracket includes a tab and is configured to rotate about a steer axis of rotation. The linear guide assembly also includes a steer link coupled between the follower and the tab, the steer link is configured to rotate the steering bracket through the tab using the linear motion of the follower. A steering angle position sensor associated with each steerable wheel is configured to detect a relative angular position of the wheel and to generate a steering angle position signal. A user input device is configured to receive a manual input from, for example, an operator, and to generate a steering command signal. The user input device is embodied in a single-axis input device, a two-axis, a keyboard, switches, joystick, trackball, mouse, other input device, or combinations thereof. In various embodiments, the steering command signal and the steering angle position signal are used to generate a wheel position command signal.

In the example embodiment, the scissors stack assembly includes a plurality of scissors linkages extendable from a retracted position, where the scissors linkages are approximately horizontally configured to an extended position, where the scissors linkages are approximately orthogonally configured with respect to each other. The scissors stack assembly is pivotally coupled to the base through a first pair of scissors linkages and is slidably coupled to the base through a second pair of scissors linkages. The base includes a slot configured to receive a pin. The base and the first pair of scissors linkages are coupled in a pivotal joint. The base and the second pair of scissors linkages are coupled in a slidable joint using the slot and pin. The pivotal joint and the slidable joint are located between the wheels spaced apart in the right/left direction and within a profile of the wheels.

The scissors lift vehicle may also include a battery compartment coupled to or formed in the carriage and that extends between the fore and aft spaced wheels and is positioned outboard of the scissors stack assembly. The battery compartment includes a power source configured to supply a total electrical requirement of the scissors lift vehicle. The scissors lift vehicle may include a plurality of battery compartments. Each battery compartment is located between the fore and aft wheels on each side of the scissors lift vehicle. Typically, the power source is a battery. In some embodiments, the power source may be embodied in an engine.

Because some of the applications for the scissors lift vehicle include lifting workers and their equipment in the interior of buildings, the scissors lift vehicle size is limited to in an athwartships direction to a distance that is less than typical door openings. The width of typical door openings may vary by geographic location, which would tend to dictate the desirable width of the scissors lift vehicle.

The following description refers to the accompanying drawings, in which, in the absence of a contrary representation, the same numbers in different drawings represent similar elements.

FIG. 1 is a side elevation view of a scissors lift vehicle 100 in accordance with an example embodiment of the present disclosure. In the example embodiment, scissors lift vehicle 100 includes a carriage 102 that includes a plurality of independently steerable wheel assemblies 104, each wheel assembly 104 includes a respective wheel 105 configured to engage a travel surface 106 during operation of scissors lift vehicle 100. Travel surface 106 could be an asphalt surface in an outdoor application of scissors lift vehicle 100 or may be concrete, wood, carpet, tile, or other surface in an indoor application of scissors lift vehicle 100. Wheels 105 are configured to rotate about a drive axis of rotation 108 and may be powered by a dedicated motor (not shown) coupled directly to each wheel 105. Wheels include a circular profile having a radius R and are spaced apart from each other along an underside of carriage 102. Typically, one wheel assembly 104 is positioned at or near each corner 110 of rectangularly-shaped carriage 102. In various embodiments, wheel assemblies 104 are spaced as far as possible to improve the stability of scissors lift vehicle 100, especially when a scissors stack assembly 112 is extended to lift a platform 113 to a working height. In various embodiments, more than four wheels 105 are used. Additionally, carriage 102 is not necessarily rectangularly-shaped, but may have other shapes, where additional wheels 105 could be used. Wheels 105 are spaced apart in a fore/aft direction 114 and in a right/left or athwartships direction (i.e., into or out of the page). Wheels 105 may be spaced from each other unequal distances apart, for example, a track of the fore wheels may be wider or narrower than the track of the aft wheels.

A base 116 is coupled to or formed with carriage 102 between wheels 105 spaced apart in the right/left direction and is positioned vertically such that base 116 lies within a profile of wheels 105.

In the example embodiment, scissors stack assembly 112 includes a plurality of scissors linkages 118 pivotally coupled together and extendable from a retracted position (shown in FIG. 1), to an extended position (not shown in FIG. 1).

Figure 2:
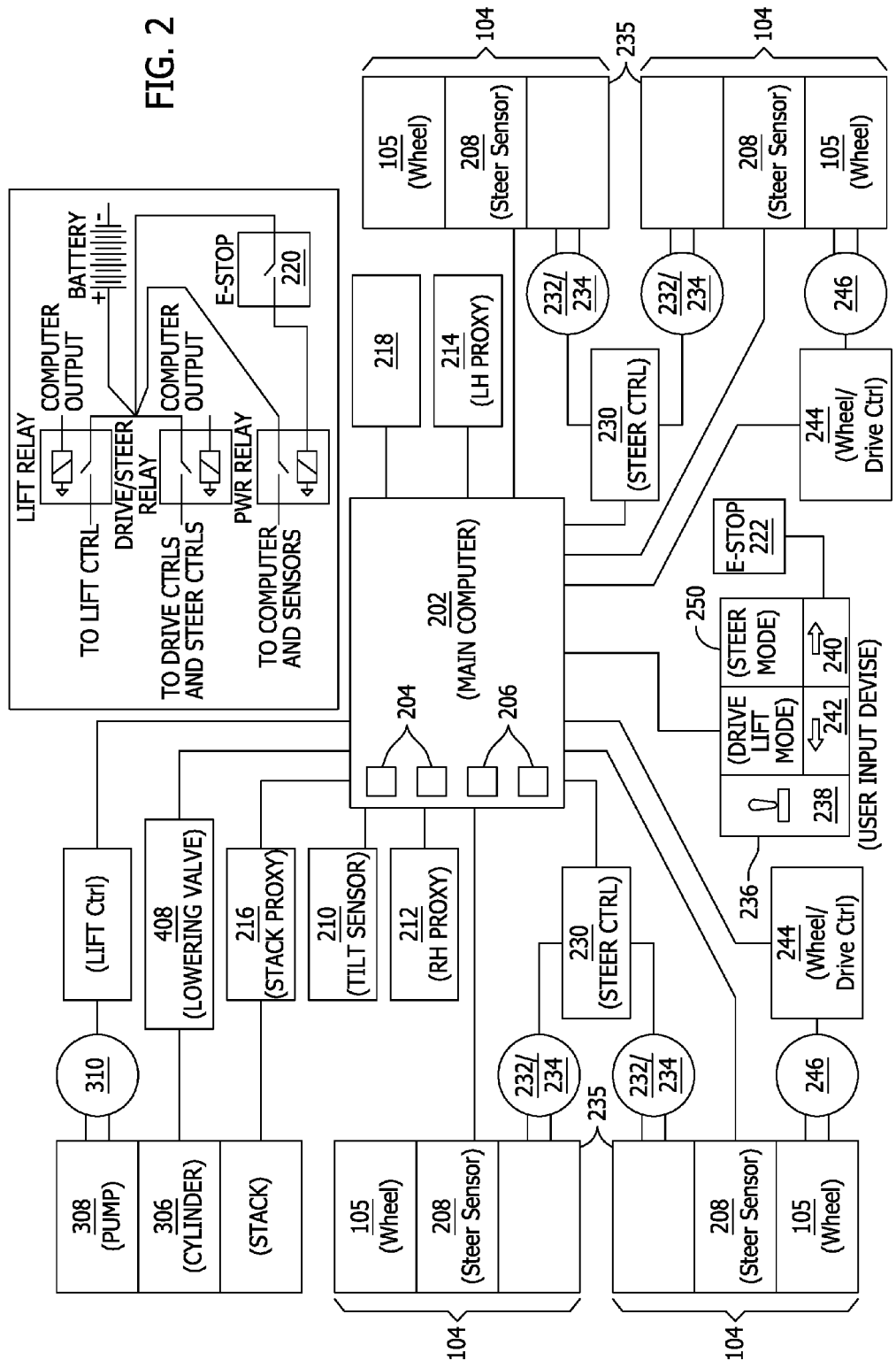

FIG. 2 is a data flow diagram of a control system 200 that may be used with scissors lift vehicle 100 (shown in FIG. 1). In the example embodiment, control system 200 includes a main control computer 202 that includes one or more processors 204 and one or more memory devices 206. The one or more processors execute one or more programs stored on the one or more memory devices 206 to perform the control functions described herein. Scissors lift vehicle 100 also includes a plurality of sensors used to determine a state of scissors lift vehicle 100 or a status of components included within scissors lift vehicle 100. The sensors include a rotary sensor 208 configured to determine a steer angle of one or more wheel assemblies 104. A tilt sensor 210 is configured to determine an angle of incline of scissors lift vehicle 100. The incline may be about a fore/aft oriented axis through scissors lift vehicle 100, which may be referred to as a roll angle. The incline may be about a side-to-side oriented axis through scissors lift vehicle 100, which may be referred to as a trim angle. Tilt sensor 210 is configured to determine any of a roll angle, a trim angle, or combinations thereof. In various embodiments, tilt sensor 210 is used as an interlock. Depending on the stack height, the output from tilt sensor 210 may be used to either shut scissors lift vehicle 100 down or reduce the travel speed of scissors lift vehicle 100. If, for example, scissors lift vehicle 100 is on a slope greater than three degrees and the platform is completely lowered then the travel is allowed however the max speed is reduced. In the event scissors lift vehicle 100 is on a slope equal or greater than three degrees and platform 113 is raised (regardless of the pothole proxy) the only operation permitted is to lower scissors stack assembly 112.

Scissors lift vehicle 100 also includes a right-hand pothole proximity switch 212 and a left-hand pothole proximity switch 214. Pothole proximity switch 212 and pothole proximity switch 214 are also used as an interlock. Depending on a height of scissors stack assembly 112, confirmation that the pothole devise (not shown) is fully deployed and locked as sensed by pothole proximity switch 212 and pothole proximity switch 214 is necessary to either raise platform 113 above a specified height or drive scissors lift vehicle 100. In the event that pothole device deployment is necessary and is not confirmed to be locked scissors lift vehicle 100 will not allow platform 113 to be raised, but will allow it to lower. Drive function is always locked out until the pothole device is deployed and locked as confirmed by pothole proximity switch 212 and pothole proximity switch 214.

A stack proximity sensor 216 is used to determine if scissors stack assembly 112 has been raised above a predetermined height.

A lowering alarm horn 218 is used to signal any of the following:
1) Platform 113 is being lowered.
2) There is a main computer or other controller fault.
3) A situation exists that requires user intervention, for example:
   a. The unit is on a slope greater than allowed to raise platform 113 and the user is attempting to raise platform 113 or platform 113 is already at a height that is greater than allowed.
   b. The pothole proximity device should be deployed and is not (meaning the stack proximity device 216 determined that scissors stack assembly 112 is of sufficient height that requires the pothole device to be deployed and locked).

Control system 200 includes an emergency stop pushbutton 220 on a lower control panel positioned proximate carriage 102 and an emergency stop pushbutton 222 on an upper control panel positioned proximate platform 113. Emergency stop pushbuttons 220 and 222 permit the user to disable scissors lift vehicle 100 in such a way that main computer 202 is not used to perform the task. If either the lower emergency stop pushbutton 220 or upper emergency stop pushbutton 222 in platform 113 is depressed, power is cut to scissors lift vehicle 100. The lower controls are redundant of the upper control (joystick) logic for raising and lowering the platform and are also required for operation of platform 113 (e.g. to raise and lower platform 113). Also the lower controls override the upper controls and are able to lock out the upper controls.

Control system 200 includes a plurality of electrical relays for controlling high current circuits with a low current control (e.g. small toggle switch or low amperage output from the computer). The relays are not used to control the logic.

A steer controller 230 is associated with a respective steer motor 232, gear box 234, and linear steer actuator 235. In the example embodiment, a user input device 236 includes a joystick speed control input 238, a right turn pushbutton 240, and a left turn pushbutton 242. A drive controller 244 is electrically coupled to a drive motor 246 associated with a respective wheel 105. Although illustrated as separate devices, main computer device 202, steer controllers 230, and drive controllers 244 may be embodied in a single device.

Drive controllers 244 are electrically coupled to a drive motor 246 associated with a respective wheel 105. Each steer controller 230 is associated with a respective steer motor 232 and gear box 234. In the example embodiment, user input device 236 includes joystick speed control input 238, right turn pushbutton 240, and left turn pushbutton 242. Although illustrated as separate devices, main computer device 202, steer controllers 230, and drive controllers 244 may be embodied in a single device.

During operation, speed in a forward or reverse direction is controlled using joystick speed control input 238. Moving joystick 238 forward a selectable amount generates a speed command that is proportional to an amount of travel of joystick 238. In some cases, the speed command may be constrained by other conditions of scissors lift vehicle 100, for example, by an interlock or an algorithm to prevent unsafe operation of scissors lift vehicle 100.

Pressing right turn pushbutton 240 starts a right turn operation. One wheel 105 of all the wheels is designated as a master wheel and the remaining wheels are designated as slave wheels to the master wheel. Main computer 202 generates a unique steer command for each wheel separately. Main computer 202 generates a steer command for the master wheel that is either full on or full off in a direction that rotates the master wheel toward a right hand turn position. The master wheel is controlled using an open-loop control scheme in that when right turn pushbutton 240 is pressed, the master wheel begins turning towards a right turn direction at full speed (i.e., steer motor 232 is commanded to maximum RPM). When right turn pushbutton 240 is released, the master wheel stops turning about the steer axis and maintains its current steering angle (i.e., steer motor 232 is commanded to zero RPM). Each of the slave wheel steering is controlled by a closed-loop control scheme. As the master wheel is turning, main computer 202 then generates respective steer commands for each of the slave wheels to maintain synchronism with the master wheel.

Each slave wheel is synchronized with the master wheel by ensuring that each slave wheel is turning about the same point on travel surface 106 as the master wheel.

Because each wheel may be starting the right turn operation from a different steering angle, main computer 202 determines a difference between each slave wheel starting steering angle to a target turn angle. The slave wheel target turn angle is determined based on the current steering angle of the master wheel. The slave wheel target turn angle command may change while the current steering angle of the master wheel changes during the right turn operation. During the turn operation, main computer 202 continuously generates steering angle commands for each of the slave wheels based on a current steering angle and the target steering angle for that slave wheel. Main computer 202 also attempts to achieve the turn as quickly as possible by determining which slave wheel has the greatest difference between the current steering angle and the target steering angle for that slave wheel. The slave wheel having the greatest difference between its current steering angle and its target steering angle is commanded to turn at the greatest rate by commanding the respective steer motor 232 to its maximum speed. Steer motors 232 for the remaining slave wheels are commanded to a speed that is proportional to the difference between that wheel's current steering angle and its target angle. When right turn pushbutton 240 is released, the master wheel steer command stops the master wheel at the current steering angle. A left turn operation performs in a similar manner.

If joystick speed control input 238 is manipulated to generate a speed command signal during a turn operation, a maximum drive speed is determined by several factors and are reduced based on any combination of a current chassis angle with respect to level, a current platform height, and a current maximum steering angle of any of the steerable wheels. The drive speed is fully proportional to the user input with the maximum user input corresponding to the determined maximum drive speed.

Scuffing of the drive wheels, when the wheels are steered from center, is eliminated by reducing the drive speed of the drive wheel corresponding to the inside wheel proportionally to the ratio of the outside drive wheel turning radius to the inside drive wheel turning radius.

In operation, a steering mode of operation is selected using steering mode switch 250 and a direction of travel and speed are input using user input device 236 embodied, in this case, in a joystick for speed control and a right-turn pushbutton 240 and a left-turn button 242. Pushing the handle of joystick 238 straight forward commands scissors lift vehicle 100 to move straight forward at a speed proportional to an amount of movement of user input device 238.

Moreover, any of the wheels may include a brake (not shown) that is used to facilitate braking scissors lift vehicle 100. The brake may be embodied in a friction brake, a dynamic braking, a regenerative brake, or combinations thereof. In various embodiments, drive motor 246 is used for dynamic braking using resistors to dissipate heat and/or regenerative braking by using the momentum of scissors lift vehicle 100 in motion to generate electrical power for charging energy storage devices (not shown), such as, but not limited to batteries and/or supercapacitors.

Figure 3:
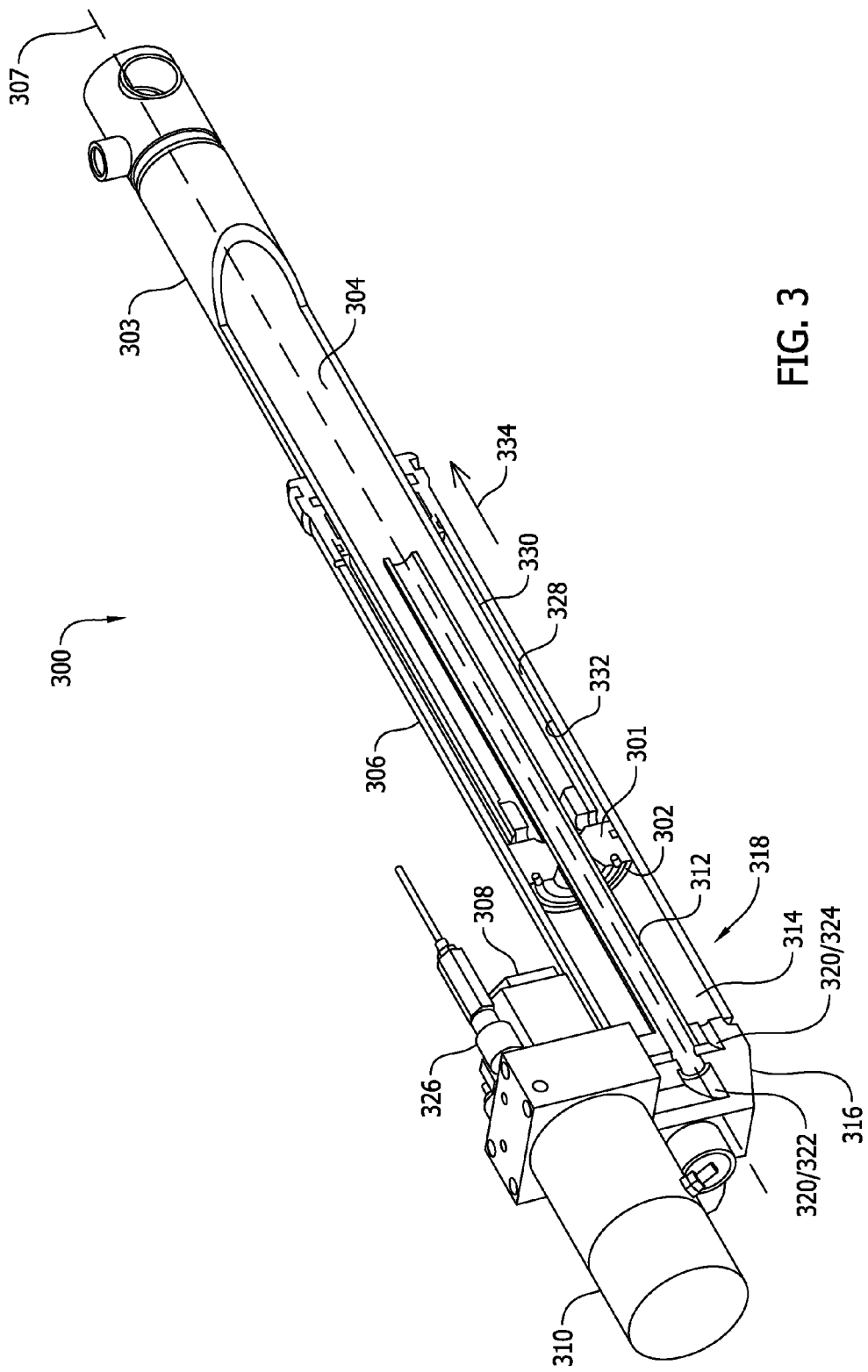

FIG. 3 is a cut-away cross-sectional view of a fluid cylinder assembly 300 in accordance with an example embodiment of the present disclosure. In the example embodiment, fluid cylinder assembly 300 includes a piston 301 having a piston face 302, a hollow piston rod 303, and an internal fluid reservoir 304. Fluid cylinder assembly 300 also includes a cylinder body 306 coaxial along axis 307 with and at least partially surrounding hollow piston rod 303. A fluid pump 308 driven by a variable speed motor 310 is in flow communication with reservoir 304 through a transfer tube 312 extending from internal fluid reservoir 304 to a suction port (not shown in FIG. 3) of fluid pump 308. A discharge port (not shown in FIG. 3) of fluid pump 308 is in flow communication with an extension pressure chamber 314 defined radially between transfer tube 312 and cylinder body 306. A valve block 316 is coupled to a first end 318 of cylinder body 306 and includes one or more fluid channels 320 formed therein. At least one of channels 320 is a pump suction channel 322 extending between transfer tube 312 and the suction port of fluid pump 308. At least one other of channels 320 is a pump discharge channel 324 extending between the discharge port of fluid pump 308 and extension pressure chamber 314. Pump discharge channel 324 further includes a check valve (not shown in FIG. 1). Pump discharge channel 324 also includes a return path including a pressure relief valve (not shown in FIG. 1). In the example embodiment, the check valve and pressure relief valve are formed together is a single pressure relief assembly 326. In various embodiments, fluid reservoir 304 includes a space 328 between an outer surface 330 of rod 303 and an inner surface 332 of cylinder body 306.

During operation, to extend fluid cylinder assembly 300, fluid is pumped from internal fluid reservoir 304 through transfer tube 312, pump suction channel 322, and the suction port of fluid pump 308. Fluid pump 308 discharges the fluid through pump discharge channel 324 and the check valve into extension pressure chamber 314. The relatively high differential pressure between extension pressure chamber 314 and internal fluid reservoir 304 applies a driving force to piston face 302 causing piston 301 to move in an extension direction 334. A speed of extension of fluid cylinder assembly 300 is relative to a speed of fluid pump 308, which is variable over a predetermined operating range.

Retraction of fluid cylinder assembly 300 is by gravity when a lowering valve is opened to channel fluid through an orificed metering valve and the lowering valve and back to internal fluid reservoir 304.

Figure 4:
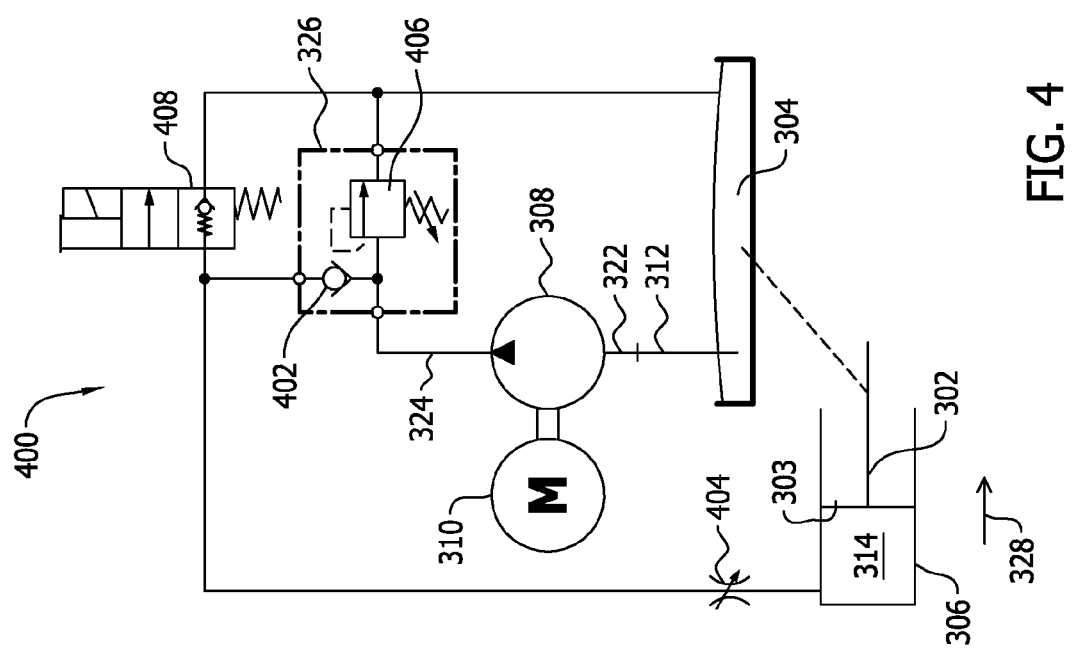

FIG. 4 is a schematic diagram of a fluid flow circuit 400 within fluid cylinder assembly 300 (shown in FIG. 3). In the example embodiment, when commanded to raise work platform 113, fluid is supplied at a variable rate from reservoir 304 through pump 308, check valve 402, and orifice 404 to extension pressure chamber 314. Because motor 310 is variable speed and directly coupled to pump 308, a rate of pumping of fluid through pump 308 is controlled by the speed of motor 310. Excess pressure above a predetermined limit is bypassed back to reservoir 304 through a pressure relief valve 406, which may be operated when pressure from pump 308 causes a ball check valve to overcome a spring bias to lift the ball and opening pressure relief valve 406.

When commanded to lower work platform 113, a normally closed lowering valve 408 is opened using a solenoid to bleed fluid from extension pressure chamber 314 through orifice 404 and lowering valve 408 to reservoir 304. Orifice 404 may be fixed or may be variable to permit adjustment of a lowering speed of work platform 113. If variable, orifice 404 is adjusted to control a speed at which work platform 113 is able to lower by controlling a rate that the fluid is permitted to bleed back to reservoir 304.

Figure 5:
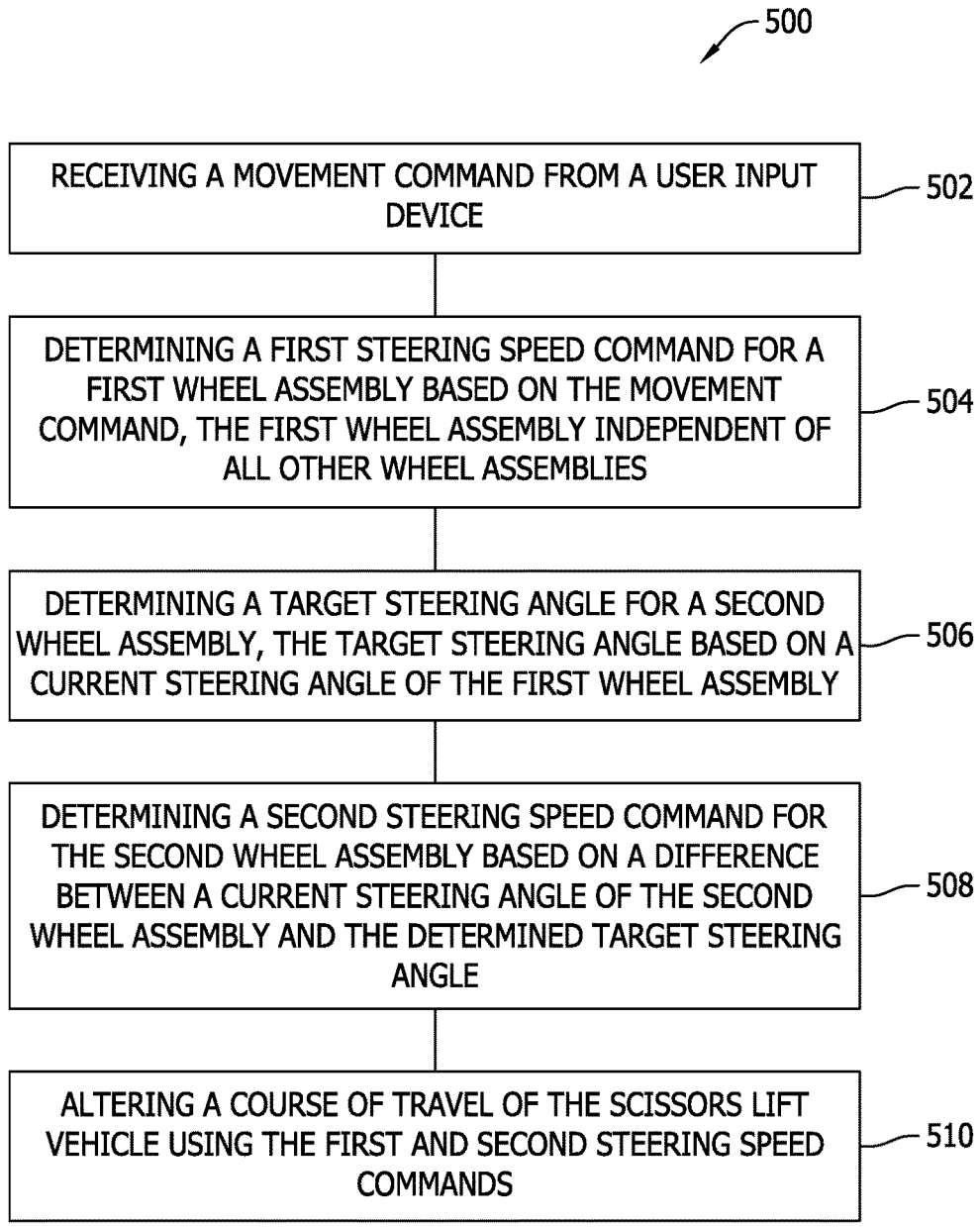

FIG. 5 is a flow diagram of a method 500 of controlling the scissors lift vehicle (shown in FIG. 1) that includes a plurality of wheel assemblies. In the example embodiment, method 500 includes receiving 502 a steer command from a user input device, determining 504 a first steering speed command for a first wheel assembly based on the steer command, the first wheel assembly independent of all other wheel assemblies, and determining 506 a target steering angle for a second wheel assembly, the target steering angle based on a current steering angle of the first wheel assembly. Method 500 also includes determining 508 a second steering speed command for the second wheel assembly based on a difference between a current steering angle of the second wheel assembly and the determined target steering angle and altering 510 a course of travel of the scissors lift vehicle using the first and second steering speed commands.

Optionally, wherein the scissors lift vehicle includes a scissors stack assembly and a scissors stack height sensor, method 500 includes determining the speed command based on the current speed of the scissors lift vehicle and a scissors stack height. Method 500 also optionally includes determining a point about which the scissors lift vehicle will turn based on the received steer command. Method 500 further optionally includes determining a steering angle command for a wheel assembly that aligns an axis of rotation of the wheel assembly with the determined point. Method 500 further optionally includes modifying at least one of a speed of the scissors lift vehicle and a direction of travel of the scissors lift vehicle comprises dynamically braking or regeneratively braking at least some of the plurality of wheel assemblies. Method 500 further optionally includes modifying at least one of a speed of the scissors lift vehicle and a direction of travel of the scissors lift vehicle comprises friction braking at least some of the plurality of wheel assemblies. Method 500 further optionally includes modifying at least one of a speed of the scissors lift vehicle and a direction of travel of the scissors lift vehicle comprises applying friction braking to at least some of the plurality of wheel assemblies using a bias member.

Figure 6A:
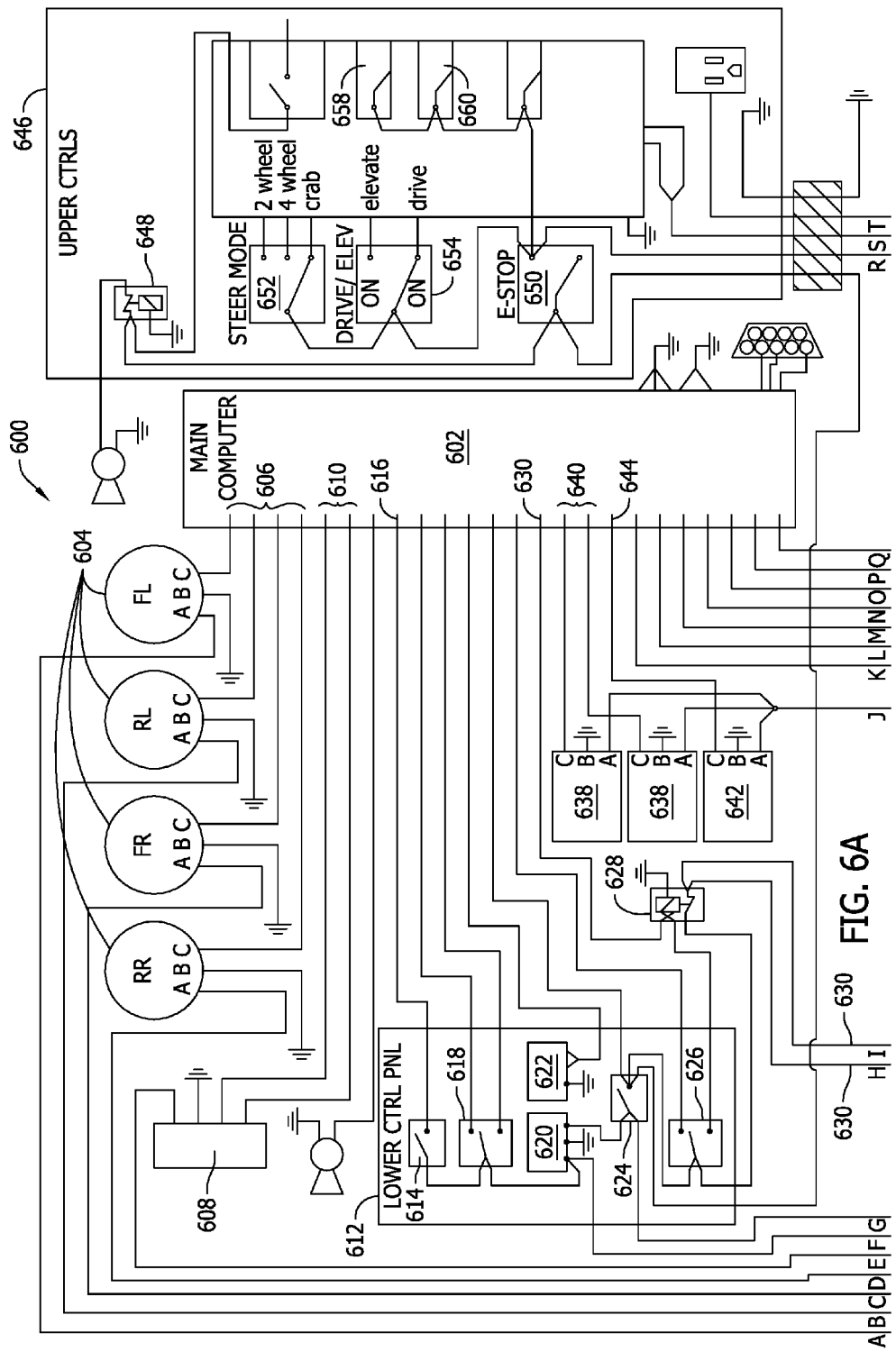
FIGS. 6A and 6B are a wiring diagram of a scissors lift control system in accordance with an example embodiment of the present disclosure.
Figure 6B:
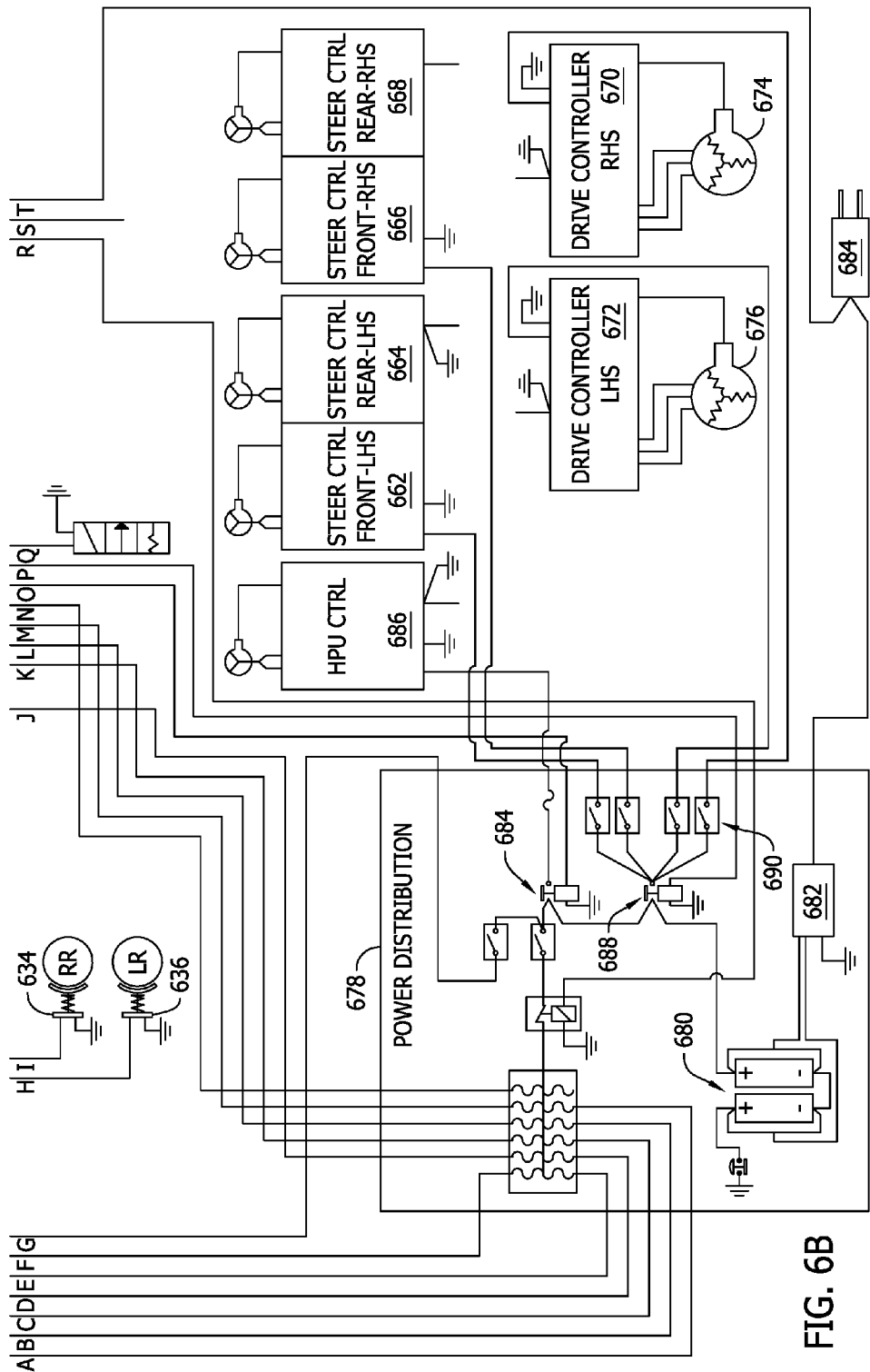

FIGS. 6A and 6B are a wiring diagram of a scissors lift control system 600 in accordance with an example embodiment of the present disclosure. In the example embodiment, control system 600 includes a microprocessor-based main computer 602 configured to receive inputs from various sensors positioned on a scissors lift (not shown in FIGS. 6A and 6B), determine virtual inputs based on the received inputs, and generate outputs based on the received inputs and the determined virtual inputs. An example of a virtual input may include a determined distance of travel or change of position based on a dead reckoning of wheel rotation, wheel angle with respect to an axis of the scissors lift, and time period of interest.

A plurality of rotary sensors 604 are configured to determine an angle of an associated wheel with respect to an axis of the scissors lift. A respective steer angle input 606 is transmitted to main computer 602 from each rotary sensor 604. A tilt sensor 608 is configured to generate at least a first tilt signal associated with a rotation of scissors lift about a first axis and a second tilt signal associated with a rotation of scissors lift about a second axis. First and second tilt inputs 610 are transmitted to main computer 602. A lower control panel 612 includes an enable switch 614 configured to receive a manual selection input 616 of lower control panel 612 being the station from which commands are able to be received. Lower control panel 612 includes a scissors lift raise and lower switch 618 configured to receive a manual input of a raise command and a lower command to control a height of lift of the scissors stack. Lower control panel 612 further includes a battery charge control 620 and an hour meter 622 configured to increment in units of time during periods when the scissors lift is active. Lower control panel 612 also includes an emergency-stop (E-stop) switch 624 configured to prevent operation of the scissors lift and a brake release override switch 626.

A first brake relay 628 is configured to receive a brake command 630 from main computer 602 and transmit a control signal 630 to each of a plurality of wheel brake actuators, for example, right rear wheel brake actuator 634 and left rear wheel brake actuator 636. Additional wheel brake actuators for other wheels may be utilized in various embodiments and first brake relay 628 is configured to provide additional control signals (not shown) to the additional wheel brake actuators.

Proximity switches 638 are configured to determine a pothole situation where the scissors lift may be traversing a ledge that exceeds a predetermined dimension. For example, a pothole or a curb. Proximity switches 638 each generate an input 640 to main computer 602 for control action. An additional proximity switch 642 is configured to determine if the scissors lift stack is not in a fully retracted position and to transmit a stack proximity input 644 to main computer 602.

An upper control panel 646, which is typically located in a work platform at the top of the scissors lift stack, includes a second brake relay 648 and a second E-stop switch 650. Upper control panel 646 further includes a steer mode switch 652 configured to receive a selection of a 2-wheel steer mode, a 4-wheel steer mode, and a crab steer mode. Upper control panel 646 also includes a drive/elevate selector switch 654 configured to receive a selection of a drive mode for the scissors lift or an elevate mode for the scissors lift. Selecting only one mode at a time prevents attempting to drive the scissors lift while the scissors lift is being elevated or from attempting to elevate the scissors lift while the scissors lift is moving. Upper control panel 646 further includes a joystick 656 configured to receive a manual input indicating a direction of steering for moving the scissors lift to a desired location. In the example embodiment, joystick 656 is a single axis joystick that includes a right turn switch 658 and a left turn switch 660. Right turn switch 658 and left turn switch 660 generate respective signals that are received by an associated steer actuator control 662, 664, 666, and 668. Because the steering of the scissors lift is four wheel independent steering, a length of time that the joystick is held in a right turn position with right turn switch 658 or in a left turn position with left turn switch 660 closed, determines a sharpness of a turn. Moreover, a mode selected by steer mode switch 652 also is used in generating the signals received by steer actuator controls 662, 664, 666, and 668.

Right hand and left hand drive controllers 670 and 672 are configured to control a speed and direction of respective drive motors 674 and 676 coupled to associated wheels (not shown). In one embodiment, each wheel of the scissors lift includes a respective drive motor and in various other embodiments, only a single wheel per side of the scissors lift is driven.

A power distribution panel 678 encloses a battery 680, a battery charger 682, which is typically supplied by a 120 Volt supply (not shown) via a wall plug 684. A lift contactor 684 is controlled by main computer 602 to supply power to a hydraulic power unit (HPU) 686. A lowering valve bleeds oil past an HPU piston to lower the scissors stack. A drive contactor 688 is controlled by main computer 602 to supply power to drive controllers 670 and 672 and steer actuator controls 662, 664, 666, and 668 through respective circuit breakers 690.

The process flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of a scissors lift vehicle provide a cost-effective and reliable means of lifting workers to an elevated work site. More specifically, the methods and systems described herein facilitate a worker's ingress and egress to a work platform coupled to a scissors lift assembly portion of the scissors lift vehicle. In addition, the above-described methods and systems facilitate accessing narrow portals to work areas. As a result, the methods and systems described herein facilitate worker safety and work site access in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A scissors lift vehicle control system comprising:
   a main computer comprising one or more processors and one or more memory devices communicatively coupled to said one or more processors;
   a steer controller configured to receive commands from said main computer to control a plurality of independently steerable wheel assemblies, each wheel assembly comprising a steer angle sensor, a steer angle actuator, and a drive motor;
   a scissors lift controller configured to control a hydraulic piston assembly comprising a hydraulic fluid reservoir internal to a piston rod assembly;
   an interlock system comprising:
      a tilt sensor configured to determine an angle of incline the scissors lift vehicle; and
      a pothole proximity switch;
   a variable-speed steer actuator configured to rotate a wheel assembly about a steer axis of rotation at a selectable rate;
   a wheel comprising a respective drive axis of rotation; and
   a variable-speed drive actuator configured to rotate said wheel about said respective drive axis of rotation at a selectable rate.

2. The scissors lift vehicle control system of claim 1, wherein the plurality of independently steerable wheel assemblies includes a wheel assembly designated as a master wheel assembly and wherein said one or more processors are configured to:
   receive a steer input from a user input device;
   generate a steer actuator speed command signal based on the steer input; and
   transmit the steer actuator speed command signal to the variable-speed steer actuator of the designated master wheel assembly.

3. The scissors lift vehicle control system of claim 1, wherein said one or more processors are configured to receive a steer mode selection including a two-wheel steer mode, a four-wheel steer mode, and a crab steer mode.

4. The scissors lift vehicle control system of claim 1, wherein said interlock system is configured to prevent operation of said scissors lift controller and said variable-speed drive actuator concurrently.

5. The scissors lift vehicle control system of claim 1, wherein said one or more processors are further configured to prevent raising a scissors stack assembly when a tilt detected by said tilt sensor exceeds a predetermined amount.

6. The scissors lift vehicle control system of claim 1, further comprising a single-axis joystick control configured to generate steering signals based on a manual input by a user.

7. The scissors lift vehicle control system of claim 1, further comprising a dual-axis joystick control configured to generate left and right steering signals and forward and reverse drive signals based on a manual input by a user.

8. The scissors lift vehicle control system of claim 1, wherein said one or more processors are configured to receive a steer angle input signal representative of an angle determined by a rotary sensor coupled to each of a plurality of independently steerable wheels.

9. The scissors lift vehicle control system of claim 1, wherein said one or more processors are configured to:
   receive a steer command from a user input device;
   determine a first steering speed command for a first wheel assembly based on the steer command, the first wheel assembly independent of all other wheel assemblies; and
   determine a target steering angle for a second wheel assembly, the determined target steering angle based on a current steering angle of the first wheel assembly.

10. The scissors lift vehicle control system of claim 9, wherein said one or more processors are further configured to:
   determine a second steering speed command for the second wheel assembly based on a difference between a current steering angle of the second wheel assembly and the determined target steering angle; and
   alter a course of travel of the scissors lift vehicle using the first and second steering speed commands.

11. A method of controlling a scissors lift vehicle, the scissors lift vehicle including a plurality of independently steerable wheel assemblies, the method comprising:
   receiving a steer command from a user input device;
   determining a first steering speed command for a first wheel assembly of the plurality of wheel assemblies based on the steer command, the first wheel assembly independent of all other wheel assemblies with respect to a steering angle, a speed of rotation about a steer axis, and a drive speed;

determining a target steering angle for a second wheel assembly, the target steering angle based on a current steering angle of the first wheel assembly;

rotating the first wheel assembly about a first wheel assembly steer axis at a first steering speed to a first wheel assembly target steering angle based on the received steer command; and rotating the second wheel assembly about a second wheel assembly steer axis at a second steering speed to the determined target steering angle, the second steering speed not intentionally constrained.

12. The method of claim 11, further comprising:

determining a second steering speed command for the second wheel assembly based on a difference between a current steering angle of the second wheel assembly and the determined target steering angle; and altering a course of travel of the scissors lift vehicle using the first and second steering speed commands.

13. The method of claim 11, further comprising receiving a steer angle input signal representative of an angle determined by a rotary sensor coupled to each of a plurality of independently steerable wheels.

14. A scissors lift vehicle comprising:

a main computer comprising one or more processors and one or more memory devices communicatively coupled to said one or more processors;

a steer controller configured to receive commands from said main computer to control a plurality of independently steerable wheel assemblies, each wheel assembly comprising a steer angle sensor, a steer angle actuator, and a drive motor;

a scissors lift controller configured to control a hydraulic piston assembly comprising a hydraulic fluid reservoir internal to a piston rod assembly;

an interlock system comprising:
a tilt sensor configured to determine an angle of incline the scissors lift vehicle; and
a pothole proximity switch;

a variable-speed steer actuator configured to rotate a wheel assembly about a steer axis of rotation at a selectable rate;

a wheel comprising a respective drive axis of rotation; and a variable-speed drive actuator configured to rotate said wheel about said respective drive axis of rotation at a selectable rate.

15. The scissors lift vehicle of claim 14, wherein the plurality of independently steerable wheel assemblies includes a wheel assembly designated as a master wheel assembly and wherein said one or more processors are configured to:

receive a steer input from a user input device;

generate a steer actuator speed command signal based on the steer input; and transmit the steer actuator speed command signal to the variable-speed steer actuator of the designated master wheel assembly.

16. The scissors lift vehicle of claim 14, wherein said one or more processors are configured to receive a steer mode selection including a two-wheel steer mode, a four-wheel steer mode, and a crab steer mode.

17. The scissors lift vehicle of claim 14, wherein said interlock system is configured to prevent operation of said scissors lift controller and said variable-speed drive actuator concurrently.

18. The scissors lift vehicle of claim 14, wherein said one or more processors are further configured to prevent raising a scissors stack assembly when a tilt detected by said tilt sensor exceeds a predetermined amount.

19. The scissors lift vehicle of claim 14, wherein said one or more processors are configured to:

receive a steer command from a user input device;

determine a first steering speed command for a first wheel assembly based on the steer command, the first wheel assembly independent of all other wheel assemblies; and determine a target steering angle for a second wheel assembly, the determined target steering angle based on a current steering angle of the first wheel assembly.

20. The scissors lift vehicle of claim 19, wherein said one or more processors are further configured to:

determine a second steering speed command for the second wheel assembly based on a difference between a current steering angle of the second wheel assembly and the determined target steering angle; and alter a course of travel of the scissors lift vehicle using the first and second steering speed commands.

* * * * *